June 27, 1950     D. C. ROGERS     2,512,681
IMPEDANCE MATCHING TRANSFORMER
Filed Nov. 11, 1944
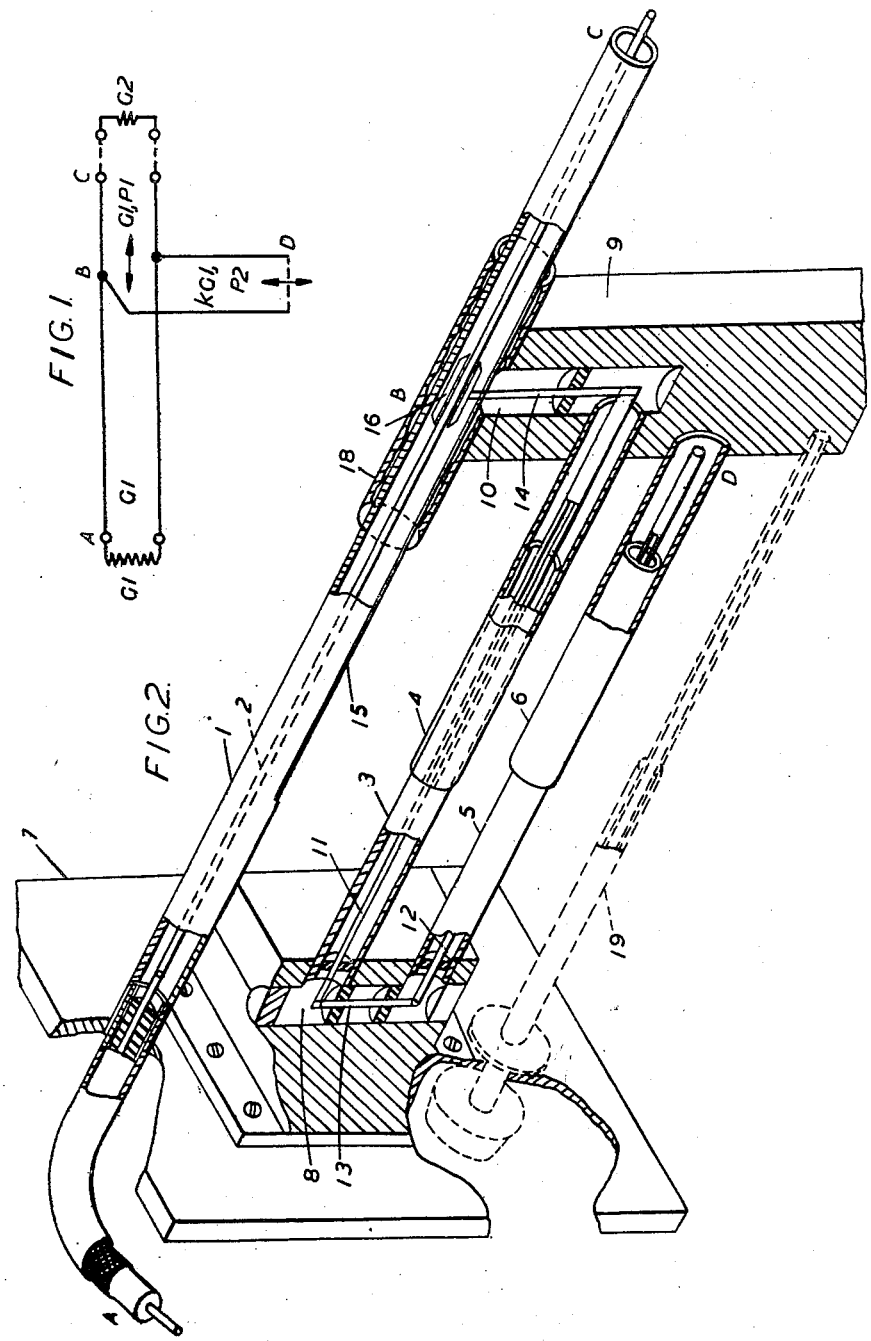
Inventor
Douglas Cecil ROGERS
By
Robert Hardingh
Attorney Patented June 27, 1950

2,512,681

UNITED STATES PATENT OFFICE 2,512,681

IMPEDANCE MATCHING TRANSFORMER

Douglas Cecil Rogers, London, England, assignor, by mesne assignments, to International Standard Electric Corporation, New York, N. Y., a corporation of Delaware Application November 11, 1944, Serial No. 563,072
In Great Britain December 1, 1943

10 Claims. (Cl. 178—44)

The present invention relates to an impedance transforming arrangement adapted for use at ultra-high frequencies.

The principal object of the invention is to provide a convenient adjustable transformer for matching two non-reactive loads having any impedances.

Various types of adjustable matching arrangements are known adapted to couple two complex impedances. All such arrangements have at least two variable elements, and in many cases there are three, the adjustments being often interdependent. The device described in the present specification was designed for the case where both the impedances to be matched are non-reactive, and where it is of importance to provide a simple adjusting arrangement.

According to the invention there is provided an electrical transforming arrangement comprising a first transmission line, a second transmission line having one end connected as a shunt to the first line, and means for simultaneously adjusting the position of the said shunt on the first line and the length of the said second line in such manner that when the first line is connected at one end to a non-reactive load having its admittance equal to the characteristic admittance of the said first line, the admittance measured at the other end of the said first line is always a pure conductance.

The invention also provides an electrical transforming arrangement comprising a first transmission line having a non-reactive load connected at one end, and a characteristic admittance equal to that of the said load, a second transmission line having one end bridged across the first line and short circuited at the other end, and means for simultaneously adjusting the bridging point on the first line and the length of the second line so as to satisfy the condition (2a) stated in this specification.

Alternatively, the second line is open at the end instead of short circuited, and condition (2b) is to be satisfied instead of condition (2a).

The invention will be explained with reference to the accompanying drawing in which Fig. 1 shows a schematic circuit diagram used to explain the principle of the invention, and Fig. 2 gives a perspective diagrammatic view of an embodiment.

The principle of the invention will be understood from Fig. 1. Let G1 and G2 be the conductances of the non-reactive loads or electrical devices which it is desired to couple together by a transforming arrangement. ABC is a uniform transmission line having branched across it at B a second uniform transmission line BD which may be either short-circuited or open at D. Both these lines are assumed to have negligible resistance and no other sources of appreciable power loss. The characteristic admittances of these lines will then be pure conductances which will be chosen to be G1 for ABC and $k.G1$ for BD where $k$ is a numerical constant. Let P1 be the propagation angle (product of the propagation constant and the length) of the portion BC, and let P2 be the propagation angle of BD. Assuming that the load G1 is connected to the line ABC at the end A, then the admittance which would be measured at B if the portion BC were removed would be $$G1(1-j.k.\cot P2) \quad (1a)$$

or $$G1(1+j.k.\tan P2) \quad (1b)$$

according as the end D is short circuited or open, respectively.

The admittance measured at C will be the admittance of the portion BC of the line ABC terminated at B by the admittance (1a) or (1b). This admittance will in general be a complex quantity, but it can easily be shown that if $$k.\cot P2 = -2.\cot 2P1 \quad (2a), \text{ for case } (1a)$$

or $$k.\tan P2 = +2.\cot 2P1 \quad (2b), \text{ for case } (1b)$$

then the admittance measured at C has no susceptance component, and the conductance component is equal to $$G1\cot^2 P1 \quad (3)$$

in both cases.

It will be apparent, therefore that whatever be the value of G2, the angle P1 can be chosen so that $$G2 = G1\cot^2 P1 \quad (4)$$

and if P2 is at the same time selected to satisfy condition (2a) or (2b), according as the end D is short-circuited or open, then the arrangement provides a means of matching the loads G1 and G2 without introducing any appreciable power loss.

By providing adjustments so that the point B can be slid along line ABC and so that the length of BD can be changed, any load G2 can be matched to the load G1.

If the two adjustments are connected by a mechanical linkage so that P1 and P2 are constrained to conform with condition (2a) or (2b), then the necessary matching can be obtained by the adjustment of a single control. It will be evident, however, that in the special case when $k=2$, the mechanical linkage becomes extremely simple, for then condition (2a) is satisfied when $P2=-2P1$, and condition (2b) when $$P2 = \frac{\pi}{2} - 2P1$$

and it is only necessary to arrange so that the length of the line BD varies just twice as fast as the length of the portion BC, and so that two angles vary in opposite directions. The constant angle $$\frac{\pi}{2}$$

which occurs in case (b) corresponds to a fixed length of the line BD which will be in circuit when $P1=0$. While a mechanical linkage could generally be devised for any other value of $k$, it would clearly be far less simple.

It will be seen, therefore, that in order to couple together any two non-reactive loads or electrical devices without loss, the transmission line ABC should be chosen to have a characteristic admittance equal to that of one of the loads, and the adjustments should be made to satisfy conditions (4), and (2a) or (2b). In a large number of cases one of these loads will consist of apparatus of some kind whose admittance is predetermined or otherwise known, so this will fix the admittance of the transmission line. This then enables the apparatus to be coupled to any one of a number of different loads, the adjustment being made to suit each of them individually.

The uniform lines ABC and BD can take any convenient forms. For example, they could be simple pairs of parallel wires, or co-axial transmission lines. Fig. 2 shows an example of a transforming arrangement in accordance with the invention in which the transmission lines are of the latter type, and which includes a mechanical arrangement for adjusting the transformation ratio by a single control, satisfying condition (2a), in which the value 2 has been chosen for $k$.

The transmission line ABC comprises a straight horizontal tube 1 with a central wire or rod conductor 2 suitably insulated therefrom by means not shown.

The transmission line BD comprises a pair of telescoping tubes 3, 4 and 5, 6 arranged parallel to the tube 1, of which the portions 3 and 5 are fixed to a panel 7 to which the tube 1 is also fixed. The two tubes 3 and 5 are connected by a short vertical tube 8 also fixed to the panel 7. The pair of lines or tubes 3, 4 and 11 with its telescoping part constitutes one telescoping section and the lines or tubes 5, 6 and 12 with its telescoping part constitutes a second telescoping section or a plurality of telescoping sections for the conductor or conductors of the shunt line.

The portions 4 and 6 of the telescoping tubes are fixed to a movable or adjustable metal block 9 and the tube 4 is connected to the tube 1 by the vertical tube 10. The block 9 forms a laterally connecting means. The tubes 3, 4 and 5, 6 and 8 are provided with central conductors 11, 12, 13 as indicated, with appropriate telescoping arrangements. The conductor 11 is connected to the conductor 2 by a vertical conductor 14 which passes through a longitudinal slot 15 in the tube 1, and which terminates in a sleeve 16 which slides on the conductor 2. The block 9 is connected to the tube 1 by means of another sleeve 18. The conductor 12 is connected to the block 9, which thus short-circuits the end of the line BD.

It will be seen that when the block 9 is slid longitudinally along the tube 1, it will vary the lengths BC and BD in opposite directions, BD being varied twice as fast as BC, thus satisfying condition (2a). Any convenient mechanism, such as the screw arrangement indicated generally at 19, may be used for this purpose. It will be evident that the load G1 should be connected at A to the two conductors of the transmission line ABC, and the load G2 at C.

Substantially the same arrangement could be used if the end D of the transmission line BD were open. In this case the tube 6 and inner conductor 12 could, for example, be continued open right through the block 9. The total length of BD would also have to be suitably chosen so that the desired constant $$\frac{\pi}{2}$$

is introduced according to condition (2b).

It will be realised that Fig. 2 is only diagrammatic and does not show many of the details which would be provided in any suitable way to form a practical arrangement. It will be evident also that the simultaneous adjustment of the two transmission lines could be carried out in various other ways, employing different types of mechanical linkage.

It will be understood that the loads G1 and G2 may represent any apparatus such as generators, receivers, transmission lines or the like, having non-reactive impedances which it may be desired to couple together without loss.

What is claimed is:

1. A transforming arrangement for matching two non-reactive electrical circuits comprising a support, a first transmission line fixedly mounted on said support, a second transmission line having at least one telescoping section, one part of said second line being fixedly mounted on said support, and one end of said second line being adjustably connected across said first transmission line, and a single control arranged between said support and said one end of said second line for simultaneously adjusting at predetermined relative rates the length of said second line and the position of its connection to said first line.

2. A transforming arrangement for matching two non-reactive electrical circuits comprising a support, a first transmission line of characteristic impedance equivalent to the impedance of one of said circuits fixedly mounted on said support, a second transmission line of characteristic impedance a constant multiple of that of said first transmission line having a plurality of telescoping sections, one part of each of said sections being fixedly mounted on said support and the other parts of all said sections being mounted together, one of said other parts being adjustably connected across said first transmission line, and a single mechanical control arranged between said support and said other parts of said telescoping sections for simultaneously adjusting at predetermined relative rates the length of said second line and the position of its connection to said first line.

3. A transforming arrangement for matching two non-reactive electrical circuits comprising a support, a first transmission line of characteristic impedance equivalent to the impedance of one of said circuits fixedly mounted on said support, a second transmission line of characteristic impedance twice that of said first line having a pair of telescoping sections, one part of each of said sections being fixedly mounted on said support and the other parts thereof being mounted together, one end of one of said other parts of said telescoping sections being adjustably connected across said first transmission line, and a single mechanical control arranged between said support and said other parts of said telescoping section for simultaneously adjusting the length of said second line at a rate twice that of the adjustment of the position of its connection to said first line.

4. A transforming arrangement according to claim 3, wherein the end of said second line other than that connected to said first line is short-circuited.

5. A transforming arrangement according to claim 3, wherein the end of said second line other than that connected to said first line is open-circuited.

6. A transforming arrangement according to claim 1, wherein the end of said second line other than that connected to said first line is short-circuited.

7. A transforming arrangement according to claim 1 wherein the end of said second line other than that connected to said first line is open-circuited.

8. A transforming arrangement for matching two non-reactive electrical circuits comprising a first transmission line for coupling said circuits, said first line having a characteristic impedance equivalent to the impedance of one of said circuits, a second transmission line of characteristic impedance, a constant multiple of that of said first line, said second line including a plurality of coaxial conductors mounted in parallel with said first line and each including a telescoping section of two parts and a first lateral connection connecting one part of each of said telescoping sections together for connecting said coaxial conductors in series, a second lateral connection movably connecting the other part of one of said telescoping sections to said first transmission line, a single mechanical control rigidly connected to the other part of the other of said telescoping sections and to said second lateral connection, and means for moving said control parallel to said conductors and said first transmission line for simultaneously adjusting at a predetermined relative rate the length of said second line and the distance of the connection of said one section of said second line to said first line from one end of said first line.

9. A transforming arrangement according to claim 8, further comprising a fixed mount, said first transmission line and said one part of each of said coaxial conductors being mounted thereon, said moving means being mounted between said single control and said fixed mount.

10. A transforming arrangement according to claim 8, wherein said second transmission line has a characteristic impedance twice that of said first line and there are only two of said coaxial conductors, whereby said length is adjusted at a rate twice that of said distance.

DOUGLAS CECIL ROGERS.

REFERENCES CITED

The following references are of record in the file of this patent:

UNITED STATES PATENTS

| Number | Name | Date |
|---|---|---|
| 2,132,208 | Dunmore | Oct. 4, 1938 |
| 2,373,233 | Dow et al. | Apr. 10, 1945 |